US011002293B2

(12) United States Patent
Anand et al.

(10) Patent No.: US 11,002,293 B2
(45) Date of Patent: May 11, 2021

(54) MISTUNED COMPRESSOR ROTOR WITH HUB SCOOPS

(71) Applicant: PRATT & WHITNEY CANADA CORP., Longueuil (CA)

(72) Inventors: Karan Anand, Mississauga (CA); Farid Abrari, Mississauga (CA); Ernest Adique, Brampton (CA); Paul Aitchison, Hamilton (CA); Daniel Fudge, Vaughan (CA); Kari Heikurinen, Oakville (CA); Paul Stone, Guelph (CA); Tibor Urac, Mississauga (CA); Thomas Veitch, Scarborough (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 370 days.

(21) Appl. No.: 15/706,311

(22) Filed: Sep. 15, 2017

(65) Prior Publication Data
US 2019/0085868 A1    Mar. 21, 2019

(51) Int. Cl.
*F04D 29/66* (2006.01)
*F01D 5/10* (2006.01)
(Continued)

(52) U.S. Cl.
CPC ............. *F04D 29/667* (2013.01); *F01D 5/10* (2013.01); *F01D 5/143* (2013.01); *F01D 5/16* (2013.01);
(Continued)

(58) Field of Classification Search
CPC ... F01D 5/10; F01D 5/143; F01D 5/16; F02K 3/06; F04D 29/321; F04D 29/324;
(Continued)

(56) References Cited

U.S. PATENT DOCUMENTS 3,536,417 A    10/1970    Merkle et al.
3,758,233 A     9/1973    Newman
(Continued)

FOREIGN PATENT DOCUMENTS

DE    102009033618    1/2011
EP         1211382    6/2002
(Continued)

OTHER PUBLICATIONS

European Search Report issued in EP 18194666.6 dated Feb. 21, 2019.
(Continued)

*Primary Examiner* — Carl C Staubach
(74) *Attorney, Agent, or Firm* — Norton Rose Fulbright Canada LLP

(57) ABSTRACT

A compressor rotor for a gas turbine engine includes a hub disposed about an axis of rotation and an outer surface forming a radially inner gaspath boundary, the outer surface defining a nominal hub diameter. A circumferential array of blades extends radially outwardly from the hub. A first inter-blade passage is defined between a first set of adjacent blades and has a first throat area. A second inter-blade passage is defined between a second set of adjacent blades and has a second throat area that is smaller than the first throat area. At least one scoop is disposed in the second inter-blade passage, the scoop defining a cavity extending radially into the outer surface of the hub relative to the nominal hub diameter.

19 Claims, 5 Drawing Sheets

(51) Int. Cl.
*F04D 29/32* (2006.01)
*F01D 5/16* (2006.01)
*F01D 5/14* (2006.01)
*F02K 3/06* (2006.01)

(52) U.S. Cl.
CPC ......... *F04D 29/321* (2013.01); *F04D 29/324* (2013.01); *F04D 29/666* (2013.01); *F02K 3/06* (2013.01); *F05D 2220/323* (2013.01); *F05D 2220/36* (2013.01); *F05D 2240/305* (2013.01); *F05D 2240/306* (2013.01); *F05D 2250/182* (2013.01); *F05D 2260/961* (2013.01)

(58) Field of Classification Search
CPC ................. F04D 29/666; F04D 29/667; F05D 2220/323; F05D 2220/36; F05D 2240/305; F05D 2240/306; F05D 2250/182; F05D 2260/961
See application file for complete search history.

(56) References Cited

U.S. PATENT DOCUMENTS

| | | | |
|---|---|---|---|
| 4,492,522 A | 1/1985 | Rossmann et al. | |
| 4,878,810 A | 11/1989 | Evans | |
| 5,286,168 A | 2/1994 | Smith | |
| 5,667,361 A | 9/1997 | Yaeger et al. | |
| 6,042,338 A | 3/2000 | Brafford et al. | |
| 6,059,533 A | 5/2000 | Stoker et al. | |
| 6,379,112 B1 | 4/2002 | Montgomery | |
| 6,428,278 B1 | 8/2002 | Montgomery et al. | |
| 6,471,482 B2 | 10/2002 | Montgomery et al. | |
| 7,354,243 B2 * | 4/2008 | Harvey | F04D 29/324 415/191 |
| 7,690,890 B2 * | 4/2010 | Aotsuka | F01D 5/143 415/191 |
| 7,753,652 B2 | 7/2010 | Truckenmueller et al. | |
| 8,043,063 B2 | 10/2011 | Kelly et al. | |
| 8,540,490 B2 | 9/2013 | Ramakrishnan et al. | |
| 8,656,589 B2 | 2/2014 | Kurt-Elli | |
| 8,727,716 B2 * | 5/2014 | Clements | F01D 5/143 415/191 |
| 9,097,125 B2 | 8/2015 | Ghorbani et al. | |
| 9,382,916 B2 | 7/2016 | Schoenenborn | |
| 9,410,436 B2 | 8/2016 | Kulathu et al. | |
| 2002/0064458 A1 | 5/2002 | Montgomery et al. | |
| 2002/0067991 A1 | 6/2002 | Montgomery et al. | |
| 2005/0042384 A1 | 2/2005 | Benedetti et al. | |
| 2007/0020101 A1 | 1/2007 | Balamucki et al. | |
| 2007/0175032 A1 | 8/2007 | Kurt-Elli | |
| 2008/0134504 A1 | 6/2008 | Schoenenborn | |
| 2010/0247310 A1 | 9/2010 | Kelly et al. | |
| 2011/0044818 A1 * | 2/2011 | Kuhne | F01D 5/143 416/212 A |
| 2012/0057982 A1 | 3/2012 | O'Hearn et al. | |
| 2012/0148401 A1 | 6/2012 | Kulathu et al. | |
| 2013/0078084 A1 | 3/2013 | Gendrich et al. | |
| 2013/0142659 A1 | 6/2013 | Glaspey | |
| 2013/0170947 A1 | 7/2013 | Kurt-Elli et al. | |
| 2013/0189111 A1 | 7/2013 | Woehler et al. | |
| 2013/0195652 A1 | 8/2013 | Pope | |
| 2013/0236319 A1 | 9/2013 | Rockarts et al. | |
| 2014/0050590 A1 | 2/2014 | Ghorbani et al. | |
| 2014/0090380 A1 * | 4/2014 | Aggarwala | F01D 5/143 60/726 |
| 2015/0078908 A1 | 3/2015 | Calza | |
| 2015/0110604 A1 | 4/2015 | Calza et al. | |
| 2015/0139789 A1 | 5/2015 | Schoenenborn | |
| 2015/0260046 A1 | 9/2015 | Broszat et al. | |
| 2015/0322803 A1 | 11/2015 | Fulayter et al. | |
| 2016/0017796 A1 * | 1/2016 | Xu | F04D 29/666 415/208.2 |
| 2016/0076392 A1 | 3/2016 | Thomas | |
| 2016/0238034 A1 | 8/2016 | Fulayter et al. | |
| 2017/0159465 A1 | 6/2017 | Schlemmer et al. | |
| 2017/0175761 A1 | 6/2017 | Schwarz et al. | |
| 2017/0175776 A1 | 6/2017 | Theratil et al. | |
| 2018/0038382 A1 | 2/2018 | Foster | |
| 2018/0080450 A1 | 3/2018 | Glavicic | |
| 2019/0101002 A1 | 4/2019 | Duffin et al. | |

FOREIGN PATENT DOCUMENTS

| | | |
|---|---|---|
| EP | 1211383 | 6/2002 |
| EP | 1746249 | 1/2007 |
| EP | 1813773 | 8/2007 |
| EP | 1985803 | 10/2008 |
| WO | 2014/070279 | 5/2014 |
| WO | 2014070279 | 5/2014 |
| WO | 2015/041758 | 3/2015 |
| WO | 2015041758 | 3/2015 |

OTHER PUBLICATIONS

European Search Report of Application No. 18194363.0 dated Feb. 11, 2019.
European Search Report of Application No. 18194668.2 dated Mar. 1, 2019.
European Search Report of Application No. 18194634.4 dated Jan. 29, 2019.
European Search Report of Application No. 18194666.6 dated Feb. 21, 2019.
Smith, Hubert—The Illustrated Guide to Aerodynamics. TAB Books. 2nd Edition, p. 21. (Year: 1992).

* cited by examiner

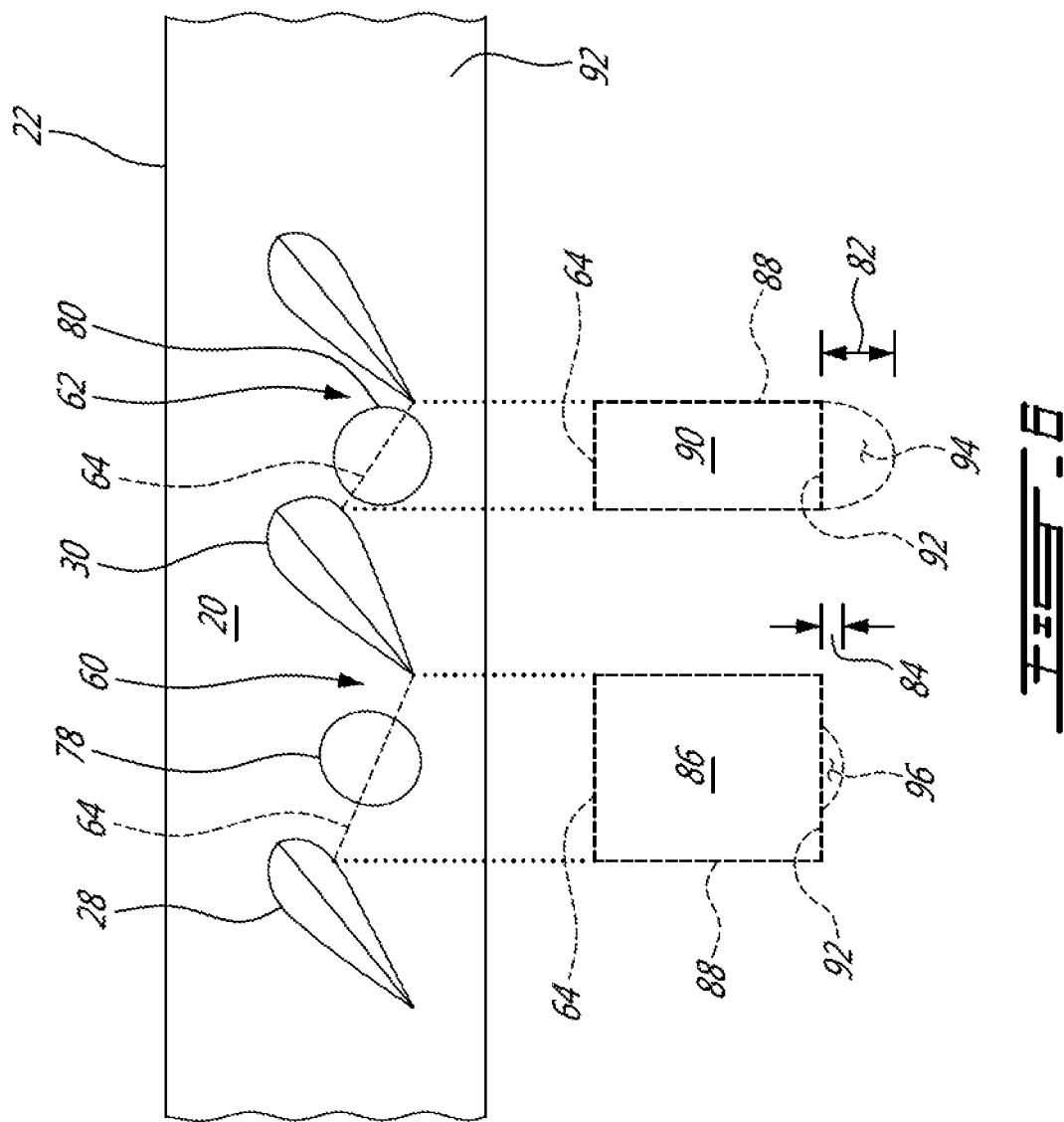

MISTUNED COMPRESSOR ROTOR WITH HUB SCOOPS

TECHNICAL FIELD

The application relates generally to rotating airfoils for gas turbine engines, and more particularly to mistuned compressor rotors.

BACKGROUND

Aerodynamic and/or vibrational instabilities, such as but not limited to flutter, can occurs in a gas turbine engine when two or more adjacent blades of a rotor of the engine, such as the fan, vibrate at a frequency close to their natural frequency and the interaction between adjacent blades maintains and/or strengthens such vibration. Other types of aerodynamic instability, such as resonant response, may also occur and are undesirable. Prolonged operation of a rotor undergoing such instabilities can cause airfoil stress loads to exceed acceptable levels for operation. Various attempts have been made to mistune adjacent blades of such rotors so as to separate their natural frequencies and reduce the likelihood of undesirable instabilities. Some mistuning solutions, however, can cause non-uniform flow patterns to develop through the rotor.

SUMMARY

There is accordingly provided a compressor rotor for a gas turbine engine, the compressor rotor comprising: a hub disposed about an axis of rotation and having an outer surface forming a radially inner gaspath boundary, the outer surface defining a nominal hub diameter; a circumferential array of blades extending radially outwardly from the hub, each blade extending along a span from the outer surface to a tip, and having a pressure side and a suction side each extending chord-wise between a leading edge and a trailing edge; a first inter-blade passage defined between a first set of adjacent blades of the circumferential array, the first inter-blade passage having a first throat area extending from the outer surface of the hub to a predetermined height along the span of the first set of adjacent blades; a second inter-blade passage defined between a second set of adjacent blades of the circumferential array, the second inter-blade passage having a second throat area extending from the outer surface of the hub to the predetermined height along the span, the second throat area smaller than the first throat area; and at least one scoop disposed in the second inter-blade passage, the at least one scoop defining a cavity extending radially into the outer surface of the hub relative to the nominal hub diameter.

There is also provided a gas turbine engine comprising: a bypass duct; and a compressor comprising: a hub disposed about an axis of rotation and having an outer surface forming a radially inner gaspath boundary, the outer surface defining a nominal hub diameter; a circumferential array of blades extending radially outwardly from the hub, each blade extending along a span from the outer surface to a tip, and having a pressure side and a suction side each extending along a chord between a leading edge and a trailing edge; a first blade, a second blade, and a third blade of the circumferential array of blades being disposed circumferentially adjacent to one another, a first inter-blade passage extending radially outwardly from the outer surface between the first and second blades, a second inter-blade passage extending radially outwardly from the outer surface between the second and third blades, the second blade having a maximum thickness greater than a corresponding maximum thickness of the first and third blades; and at least one scoop disposed in the second inter-blade passage, the at least one scoop defining a cavity extending radially into the outer surface of the hub relative to the nominal hub diameter.

There is further provided a method of reducing flow patterns disparities between at least a first and second inter-blade passages of a mistuned compressor for a gas turbine engine, the method comprising increasing a throat area of the second inter-blade passage to correspond to a throat area of the first inter-blade passage by extending at least one scoop into an outer surface of the compressor within the second inter-blade passage.

BRIEF DESCRIPTION OF THE DRAWINGS

Reference is now made to the accompanying figures in which:

FIG. 6 is a schematic, partially cut-away top view of the fan rotor shown in FIG. 3, in accordance to another particular embodiment.

DETAILED DESCRIPTION

Figure 1:
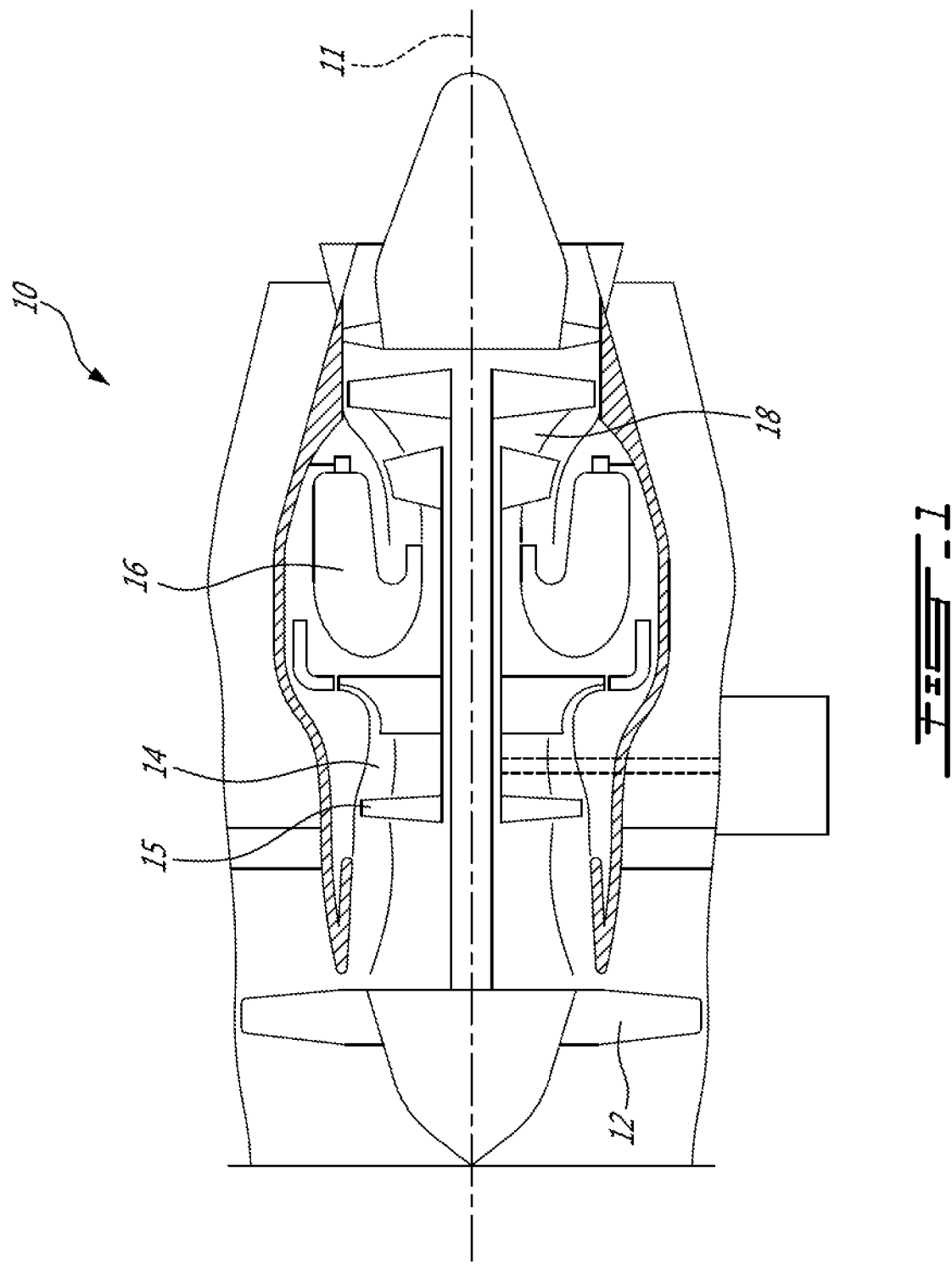
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include one or more axial compressor rotors 15. Although the example below is described as applied to a fan of a turbofan engine, it will be understood the present teachings may be applied to any suitable gas turbine compressor rotor. Although the fan of a turbofan engine is often identified separately form the compressors within the core of the engine, it is to be understood that the fan 12 is itself in fact a low pressure compressor rotor. Accordingly, the term "compressor rotor" as used herein is understood to include both a fan 12 and a rotor 15 of an axial compressor within the engine core.

Figure 2:
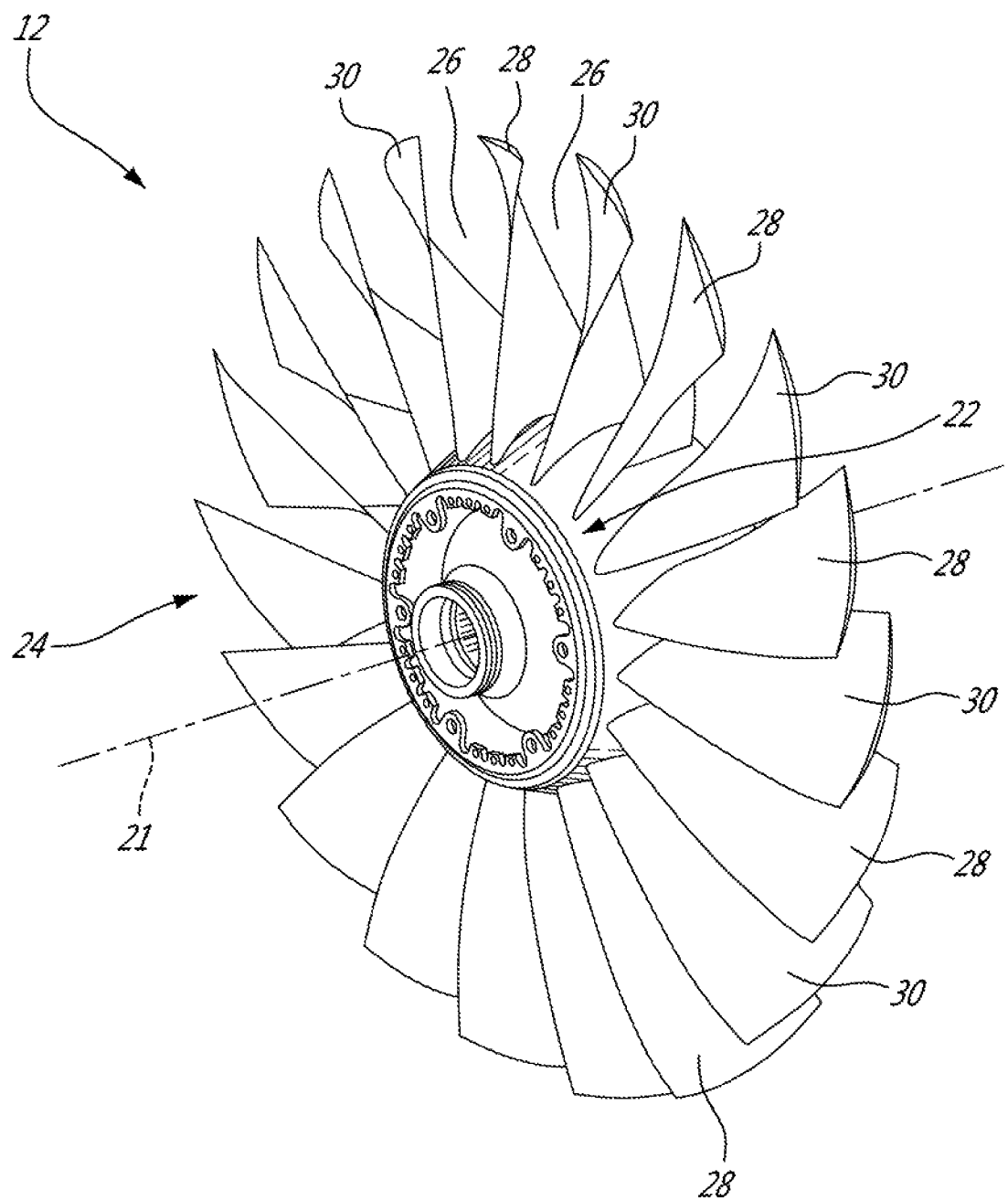
FIG. 2 is a perspective view of a fan rotor of the gas turbine engine shown in FIG. 1.

As shown in more details in FIG. 2, the fan 12 includes a central hub 22, which in use rotates R about an axis of rotation 21, and a circumferential row of fan blades 24 that are circumferentially distributed and which project a total span length L from an outer surface 20 in a span-wise direction (which may be substantially radially) into a gas path of the engine 10. The outer surface 20 defines an inner boundary of the gas path. In the embodiment shown, the outer surface 20 is a hub surface. In an alternate embodiment, the outer surface 20 is a surface of a shroud mounted above the hub 22. The axis of rotation 21 of the fan 12 may be coaxial with a main engine axis 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. Each circumferentially adjacent pair of fan blades 24 defines an inter-blade passage 26 therebetween for the working fluid.

The circumferential row of fan blades 24 of fan 12 includes two or more different types of fan blades 24, in the sense that a plurality of sets of blades are provided, each set having airfoils with non-trivially different shapes, which difference will be described in more details below and illustrated in further figures. The two or more different types of fan blades 24 are composed, in this example, of successively circumferentially alternating sets of fan blades, each set including at least first and second fan blades 28 and 30 (the blades 28 and 30 having profiles which are different from one another, as will be described and shown in further details below).

In the exemplarity embodiment of FIG. 2, the fan 12 therefore includes circumferentially alternating sets of fan blades 24, which includes blade types A (blade 28), B (blade 30), A (blade 28), B (blade 30), etc., in circumferentially successive order. It is to be understood, however, that each of these sets of fan blades 24 may include more than two different blade types, and need not comprise pairs, or even numbers, of blade types. For example, each set of fan blades may include three or more fan blades which differ from each other (e.g. a circumferential distribution of the fan blades may include, in circumferentially successive order, blade types: A, B, C, A, B, C; or A, B, C, D, A, B, C, D, etc., wherein each of the capitalized letters represent different types of blades as described above). The embodiment described below includes, for the sake of simplicity of explanation, a fan 12 having circumferentially alternating sets of fan blades each composed of only two different blade types, namely blades 28 (e.g. blade type "A") and 30 (e.g. blade type "B"). This constitutes, accordingly, a circumferential distribution of fan blades in this example which follows a circumferential sequence of blade types A, B, A, B, etc.

Flow-induced resonance refers to a situation where, during operation, adjacent vibrating blades transfer energy back and forth through the air medium, which energy continually maintains and/or strengthens the blades' natural vibration mode. Fan blades have a number of oscillation patterns, any of which, if it gets excited and goes into resonance, can result in flow induced resonance issues.

The different profiles of the first and second fan blades 28 and 30 provide a natural vibrational frequency separation between the adjacent blades 28, 30, which may be sufficient to reduce or impede unwanted resonance between the fan blades 24. Regardless of the exact amount of frequency separation, the first and second fan blades 28 and 30 are therefore said to be intentionally "mistuned" relative to each other, in order to reduce the occurrence and/or delay the onset, of flow-induced resonance.

Figure 3:
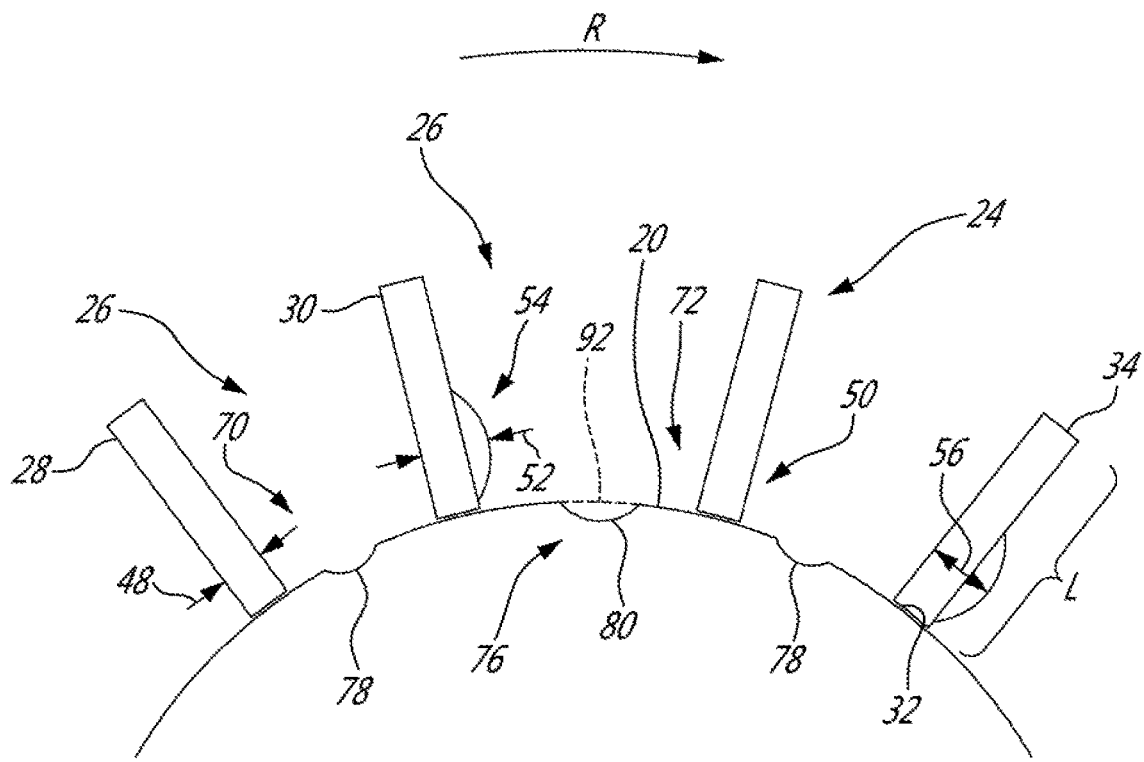
FIG. 3 is a schematic cross-sectional view of the fan rotor shown in FIG. 2, in accordance to a particular embodiment.
Figure 4:
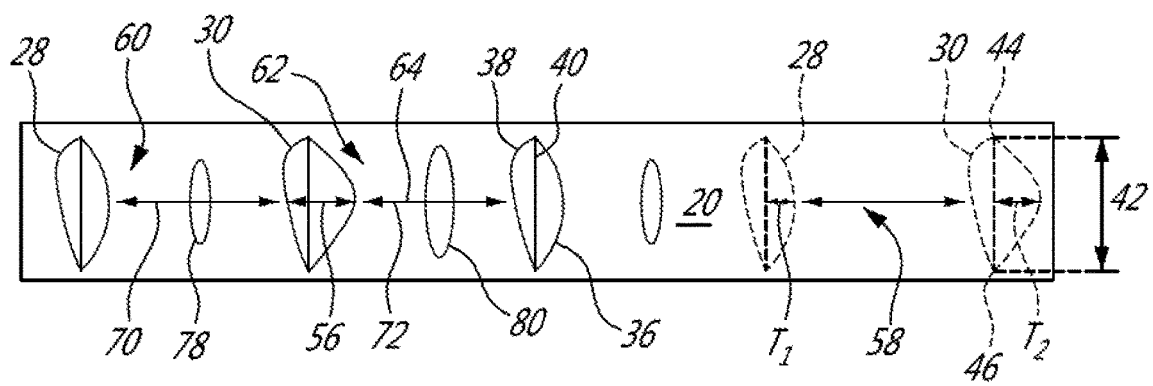
FIG. 4 is a schematic top view of the fan rotor shown in FIG. 3, in accordance to another particular embodiment.

Referring to FIGS. 3 and 4, each blade 24 extends along the span L of the blade 24 from the outer hub surface 20 between a root 32 and a tip 34. The blade 24 has a pressure side 36 and a suction side 38 on opposite sides of a camber line 40 (FIG. 4). The pressure and suction sides 36, 38 extend along a chord 42 of the blade 24 between a leading edge 44 and a trailing edge 46.

In the embodiment shown in FIG. 3, the first fan blade 28 has a blade thickness 48 at a root section 50 and the second fan blade 30 has a different blade thickness 52 at a root section 54. In the embodiment shown, the term "blade thickness" as used herein refers generally to a maximum blade thickness of the airfoil or the blade 24, at a given span-wise location.

Referring to FIG. 4, a pressure side thickness T1 of the first blade 28 at the root section 50 is less than a pressure side thickness T2 of the second blade 30 at the root section 54, while the suction sides 38 of the first and second blades 28, 30 are the same.

As shown in FIGS. 3 and 4, the fan 12 includes two or more different types of inter-blade passages 26, in the sense that a plurality of sets of inter-blade passages 26 are provided, each set having throat sections 58 with different shapes and/or sizes. The two or more different types of inter-blade passages 26 are composed, in this example, of successively circumferentially alternating sets of inter-blade passages, each set including at least first and second inter-blade passages 60 and 62 (the inter-blade passages 60 and 62 having throat sections 58 which are different from one another, as will be described and shown in further detail below). The term "throat section" is used to designate a region of the inter-blade passage 26 which extends from its smallest cross-section 64 along a portion of the length of the inter-blade passage 26. The term "throat cross-section" is used to designate a cross-section of the inter-blade passage 26 constituting its smallest cross-section 64 along the entire length of the inter-blade passage 26.

In a particular embodiment, the inter-blade passage 26 extends radially from the outer hub surface 20 to a radius up to 20% of the span of the blade 24. In another embodiment, the inter-blade passage 26 extends radially up to a radius of 50% of the span of the blade 24. In yet another embodiment, the inter-blade passage 26 extends radially along the entire span of the blade 24.

In the exemplarity embodiment of FIG. 4, the fan 12 therefore includes circumferentially alternating sets of inter-blade passages 26, which includes inter-blade passage types AA (inter-blade passage 60) and BB (inter-blade passage 62), in circumferentially successive order (i.e. AA (inter-blade passage 60), BB (inter-blade passage 62), AA (inter-blade passage 60), BB (inter-blade passage 62), etc.). It is to be understood, however, that each of these sets of inter-blade passages 26 may include more than two different inter-blade passage types, and need not comprise pairs, or even numbers, of inter-blade passage types. For example, each set of inter-blade passages may include three or more inter-blade passages which differ from each other (e.g. a circumferential distribution of the inter-blade passages may include, in circumferentially successive order, inter-blade passage types: AA, BB, CC, AA, BB, CC; or AA, BB, CC, DD, AA, BB, CC, DD, etc., wherein each of the capitalized letters represent different types of inter-blade passages as described above). The embodiment described below includes, for the sake of simplicity of explanation, a fan 12 having circumferentially alternating sets of inter-blade passages 26 each composed of only two different inter-blade passage types, namely inter-blade passage 60 (e.g. inter-blade passage type "AA") and 62 (e.g. inter-blade passage type "BB"). This constitutes, accordingly, a circumferential distribution of inter-blade passages in this example which follows a circumferential sequence of inter-blade passage types AA, BB, AA, BB, etc.

The first inter-blade passage 60 has a throat section 70 that is larger than a throat section 72 of the second inter-blade passage 62. Therefore, the working fluid flowing through the first inter-blade passage 60 can have a different flow distribution or pattern than the working fluid flowing through the second inter-blade passage 62. For example, the flow flowing through the smaller throat section 72 may accelerate relative to the flow flowing through the larger throat section 70. A difference in size between the throat sections defines a throat reduction. The throat reduction can be viewed as a partial flow "blockage", caused by the increased thickness of the second blade 30, relative to the thickness of the first blade 28.

The fan 12 includes one or more hub scoops 76 that extend into the outer hub surface 20 within the inter-blade passages 26 to define a cavity. The term "hub scoop" as used herein refers generally to a concave or other depressed surface extending from the outer hub surface 20 (defining the radially inner boundary of the gas path) into the hub 22 of the fan 12 or compressor rotor to define the cavity between the inner boundary of the gas path and the concave or other depressed surface (e.g. the hub scoop 76). The hub scoop 76 can be any suitable surface depression of the outer hub surface 20 such as pockets, creases, grooves, slots, and the like. In the example mentioned above having the inter-blade passages types AA and BB in circumferentially successive alternation, the hub scoop 76 is defined between the pressure side 36 of the second blade 30 and the suction side 38 of the first blade 28 i.e., within the inter-blade passage 62 that has a throat reduction.

The hub scoop 76 has a shape that is configured to increase the throat section volume or area (i.e. when the throat section is considered to be the throat cross-section). The hub scoop 76 can be provided in the second inter-blade passage 62 to increase the volume or area of the throat section 72. In a particular embodiment, the hub scoop 76 increases the cross-sectional area of the throat section 72 by adding the cross-sectional area of the hub scoop 76 to the original cross-sectional area of the inter-blade passage 62. The hub scoop 76 can be located at or toward the leading edge 44 of the adjacent blades 24. In another particular embodiment, the hub scoop 76 is located at the chordwise location of the maximum blade thickness 56 or at the chordwise location of a region of the blade 24 containing the maximum blade thickness. This region of the blade 24 can extend along the span L and/or the chord of the blade. In a particular embodiment, the region containing the maximum blade thickness 56 extends from the maximum thickness 56 (shown in FIG. 4) spanwise toward the tip 34 and toward the root 32, respectively. The region of the blade containing the maximum blade thickness 56 can also extend from the maximum thickness 56 chordwise toward the leading edge 44 and toward the trailing edge 46, respectively. The hub scoop 76 can be located at other suitable locations within the inter-blade passage 26. The hub scoop 76 can be sized and positioned to increase the throat section 72 of the second inter-blade passage 62 to a size corresponding to the size of the throat section 70 of the first inter-blade passage 60. The term "corresponding" as used herein refers to at least one specific relationship between the elements to which the term refers. For example, the term "corresponding" can refer to elements having the same or nearly the same size, shape, area and/or volume (e.g. providing corresponding throat sections for providing a more uniform flow through the inter-blade passages).

In a particular embodiment, a volume of the hub scoop 76 corresponds to a volume of the throat reduction. In another embodiment, the volume of the hub scoop 76 is proportional to the volume of the throat reduction. For example, as the cross-sectional area or volume of the throat reduction increases, the cross-sectional area or volume of the hub scoop 76 proportionally increases to minimize nonuniform flow patterns through the inter-blade passages 26. The hub scoop 76 is generally located at the throat section of the inter-blade passage. For example, a maximum width of the hub scoop 76 can be positioned at a chordwise location of the smallest cross-section 64 of the throat section 72.

In the embodiment shown in FIGS. 3 and 4, the fan 12 includes two different hub scoops 78, 80. Hub scoop 78 is defined in the outer hub surface 20 within the first inter-blade passage 60 and hub scoop 80 is defined in the outer hub surface 20 within the second inter-blade passage 62. These hub scoops 78, 80 are sized, shaped and positioned to uniformalise, to the extent possible, the flow through the first and second inter-blade passages 60 and 62.

Figure 5:
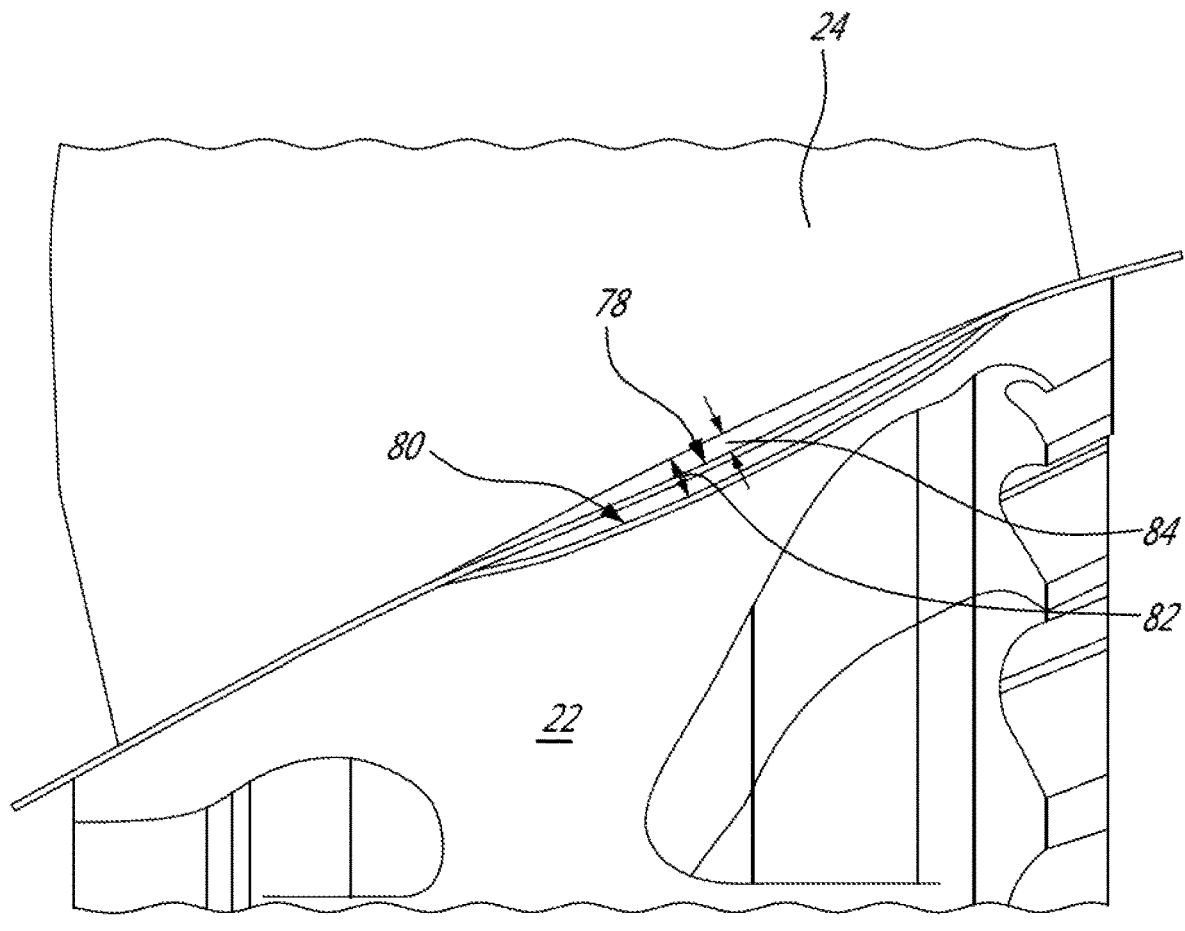
FIG. 5 is a schematic cross-sectional view of a hub of the fan rotor showing two adjacent hub scoops in accordance to a particular embodiment.

In a particular embodiment, the hub scoop 80 is wider than the hub scoop 78. In the embodiment shown in FIG. 5, the hub scoop 80 extends relatively further inward into the hub 22 as compared to hub scoop 78. As shown in FIG. 5, a maximum depth 82 of the hub scoop 80 is larger than a maximum depth 84 of the hub scoop 78. In yet a further embodiment, the hub scoop 80 is both deeper and wider than the hub scoop 78.

In a particular embodiment, providing the hub scoops 78, 80 increases a volume of the first inter-blade passage 60 to correspond to a volume of the second inter-blade passage 62. In another particular embodiment, the throat cross-sectional area of the first inter-blade passage 60 at the throat section 70 including the cross-sectional area of the first hub scoop 78 corresponds to the throat cross-sectional area of the second inter-blade passage 62 at the throat section 72 including the cross-sectional area of the second hub scoop 80.

In a particular embodiment, the outer hub surface 20 is free of surface projections or elevations into the gas path. For example, the outer hub surface 20 remains a smooth circumferential surface except where the hub scoops 78, 80 are located. Along the outer hub surface 20 from blade 28 to blade 30, the outer hub surface 20 does not rise. In a particular embodiment where the outer hub surface rises (including projections, bulges and the like), a larger or additional hub scoops may be provided, as described above.

To reduce flow pattern disparities between the inter-blade passages 60, 62, the size of the throat section 70 within the first inter-blade passage 60 is increased to correspond to a the size of the throat section 72 of the second inter-blade passage 62. As mentioned above, the "size" as used herein can be the cross-sectional area of the throat section and/or the volume of the throat section, and thus the corresponding cross-sectional area and/or volume of the cavity formed by the hub scoop. This can be accomplished, for example, by providing the hub scoop 76 or 80 within the inter-blade passage 62. In a particular embodiment, the size of the hub scoop 76 is the same as the volume of the throat reduction. In another embodiment, the volume of the hub scoop 76 is proportional to the volume of the throat reduction.

Referring to FIG. 6, a first throat area 86 of the first inter-blade passage 60 is defined as a product (multiplication) of the smallest cross-section 64 within the first inter-blade passage 60 and a predetermined height 88 along the span. The predetermined height 88 can be selected to define a root section of the blades 24 where the blade thickness 48 is different therebetween. Similarly, a second throat area 90 of the second inter-blade passage 62 is defined as a product of the smallest cross-section 64 within the second inter-blade passage 62 and the predetermined height 88 along the span. The second throat area 90 is smaller than the first throat area 86, mainly because of the increased thickness of blade 30 relative to blade 28.

In this particular embodiment, a nominal hub diameter 92 of the hub 22 (also shown in FIG. 3) is defined as a radially outermost circumference of the hub 22. The hub diameter 92 need not necessarily be construed as the physical surface on the radially outermost side of the hub 22. Rather, the hub diameter 92 refers to a spatial attribute of the outer diameter of the hub 22 regardless of the presence of the scoops 78, 80. That is, the hub diameter 92 may or may not have scoops 78 defined therein.

The first scoop 78 defines a cavity that extends radially into the outer surface 20 relative to the hub diameter 92 of the hub 22. The second scoop 80 also defines a cavity that extends radially into the outer surface 20 relative to the hub diameter 92 of the hub 22. As shown in FIG. 6, the maximum depth 82 of the second scoop 80 is greater than the maximum depth 84 of the first scoop 78.

A cross-sectional area 94 of the scoop 80 may be said to be "in register" with the cross-sectional throat area 90, in that the cross-sectional area 94 of the scoop 80 is aligned and in communication with the cross-sectional throat area 90. The new "throat area" seen by the airflow is the total of the second throat area 90 and the cross-sectional area 94 of the scoop 80 that is in register with the second throat area 90. In use, the cross-sectional area 94 of the second scoop 80 compensates for the reduction of throat areas 86, 90 between the first inter-blade passage 60 and the second inter-blade passage 62. This compensation may provide a more uniform airflow through the fan 12.

In a particular embodiment, the cross-sectional area 94 of the scoop 80 is proportional to a differential between the first throat area 86 and the second throat area 90. That is, a total area of the first throat area 86 and a cross-sectional area 96 of the first scoop 78 is equal to, or substantially equal to, a total area of the second throat area 80 and the cross-sectional area 94 of the second scoop 80. In an alternate embodiment, the cross-sectional area 94 of the second scoop 80 can range inclusively between 50% to 150% of the differential between the throat areas 86 and 90. The throat in the inter-blade passage 26 is where the airflow generally chokes first. Thus, an increase of the cross-sectional area 94 of the second scoop 80 within the second inter-blade passage 62 may increase the area of the actual throat area seen by the airflow to minimize choking the airflow relative to only the second throat area 90 without the increase in the cross-sectional area 94 of the second scoop 80.

The above description is meant to be exemplary only, and one skilled in the art will recognize that changes may be made to the embodiments described without departing from the scope of the invention disclosed. For example, other compressors of the engine can include the hub scoop(s) and the mistuned blades as described herein. Still other modifications which fall within the scope of the present invention will be apparent to those skilled in the art, in light of a review of this disclosure, and such modifications are intended to fall within the appended claims.

The invention claimed is:

1. A compressor rotor for a gas turbine engine, the compressor rotor comprising:
   a hub disposed about an axis of rotation and having an outer surface forming a radially inner gaspath boundary, the outer surface defining a nominal hub diameter;
   a circumferential array of blades extending radially outwardly from the hub, each blade extending along a span from the outer surface to a tip, and having a pressure side and a suction side each extending chord-wise between a leading edge and a trailing edge;
   a first inter-blade passage defined between a first set of adjacent blades of the circumferential array, the first inter-blade passage having a first throat area extending from the outer surface of the hub to a predetermined height along the span of the first set of adjacent blades, the first inter-blade passage being free of projections from the outer surface of the hub into the first inter-blade passage;
   a second inter-blade passage defined between a second set of adjacent blades of the circumferential array, the second inter-blade passage having a second throat area extending from the outer surface of the hub to the predetermined height along the span, the second throat area smaller than the first throat area, the second inter-blade passage being free of projections from the outer surface of the hub into the second inter-blade passage; and
   at least one scoop disposed in the second inter-blade passage, the at least one scoop defining a cavity extending radially into the outer surface of the hub relative to the nominal hub diameter.

2. The compressor rotor as defined in claim 1, wherein the at least one scoop has a cross-sectional area aligned and in communication with the second throat area, the cross-sectional area is proportional to a differential between the first throat area and the second throat area.

3. The compressor rotor as defined in claim 1, wherein the at least one scoop has a cross-sectional area aligned and in communication with the second throat area, the cross-sectional area is between 50% to 150% of a differential between the first throat area and the second throat area.

4. The compressor rotor as defined in claim 1, wherein the at least one scoop comprises a first scoop extending into the outer surface within the first inter-blade passage and a second scoop extending into the outer surface within the second inter-blade passage, a maximum depth of the second scoop is greater than a maximum depth of the first scoop.

5. The compressor rotor as defined in claim 1, wherein the array of blades comprises at least a set of blades including a first blade having a first blade thickness at a root section thereof and a second blade having a second blade thickness at a root section thereof, the second blade thickness greater than the first blade thickness, the at least one scoop defined between the pressure side of the second blade and the suction side of the first blade.

6. The compressor rotor as defined in claim 1, wherein the suction side of each blade of the array of blades has a same profile as the suction side of a remaining blade of the array of blades.

7. The compressor rotor as defined in claim 1, wherein the predetermined height extend up to 20% of the span.

8. The compressor rotor as defined in claim 1, wherein the at least on scoop comprises a first scoop extending into the outer surface within the first inter-blade passage and a second scoop extending into the outer surface within the second inter-blade passage, a sum between the first throat area and a cross-sectional area of the first scoop aligned and in communication with the first throat area is proportional to a sum between the second throat area and a cross-sectional area of the second scoop aligned and in communication with the second throat area.

9. A gas turbine engine comprising:
   a compressor section, a combustor, and a turbine section; and
   the compressor section including a compressor rotor comprising:

a hub disposed about an axis of rotation and having an outer surface forming a radially inner gaspath boundary, the outer surface defining a nominal hub diameter;

a circumferential array of blades extending radially outwardly from the hub, each blade extending along a span from the outer surface to a tip, and having a pressure side and a suction side each extending along a chord between a leading edge and a trailing edge;

a first blade, a second blade, and a third blade of the circumferential array of blades being disposed circumferentially adjacent to one another, a first inter-blade passage extending radially outwardly from the outer surface between the first and second blades, a second inter-blade passage extending radially outwardly from the outer surface between the second and third blades, the second blade having a maximum thickness greater than a corresponding maximum thickness of the first and third blades, the second blade having an airfoil with a shape and/or thickness that is different from that of an airfoil of the first and third blades; and at least one scoop disposed in the second inter-blade passage, the at least one scoop defining a cavity extending radially into the outer surface of the hub relative to the nominal hub diameter, the outer surface of the hub being free from surface projections into the first and second inter-blade passages.

10. The gas turbine engine as defined in claim 9, wherein the at least one scoop has a cross-sectional area aligned and in communication with a throat area of the second inter-blade passage, the cross-sectional area of the at least one scoop is between 50% to 150% of a differential between a throat area of the first inter-blade passage and the throat area of the second inter-blade passage.

11. The gas turbine engine as defined in claim 9, wherein the at least one scoop comprises a first scoop extending into the outer surface within the first inter-blade passage and a second scoop extending into the outer surface within the second inter-blade passage, a maximum depth of the second scoop is greater than a maximum depth of the first scoop.

12. The gas turbine engine as defined in claim 9, wherein the at least one scoop is defined between the pressure side of the second blade and the suction side of the first blade at a location aligned and in communication with a throat area of the second inter-blade passage.

13. The gas turbine engine as defined in claim 9, wherein the suction side of each blade of the array of blades has a same profile as the suction side of a remaining blade of the array of blades.

14. The gas turbine engine as defined in claim 9, wherein the first and second inter-blade passages extend radially from the outer surface to a radius up to 20% of the span of adjacent blades.

15. The gas turbine engine as defined in claim 9, wherein the at least one scoop comprises a first scoop extending into the outer surface within the first inter-blade passage and a second scoop extending into the outer surface within the second inter-blade passage, a sum between a first throat area of the first inter-blade passage and a cross-sectional area of the first scoop aligned and in communication with the first throat area is proportional to a sum between a second throat area of the second inter-blade passage and a cross-sectional area of the second scoop aligned and in communication with the second throat area.

16. The compressor rotor as defined in claim 1, wherein the first set of adjacent blades and the second set of adjacent blades successively circumferentially alternate about the hub.

17. The compressor rotor as defined in claim 1, wherein the array of blades comprises at least a first blade type and a second blade type, the first and second blade types having different airfoil shapes and/or thicknesses, the first set of adjacent blades including the first and second blade types, and the second set of adjacent blades including the first and second blade types.

18. The compressor rotor as defined in claim 17, wherein the first throat area is defined between the suction side of the first blade type and the pressure side of the second blade type, and the second throat area is defined between the suction side of the second blade type and the pressure side of the first blade type.

19. The gas turbine engine as defined in claim 9, wherein the at least one scoop has a cross-sectional area, the cross-sectional area of the at least one scoop being proportional to a differential between a throat area of the first inter-blade passage and the throat area of the second inter-blade passage.

* * * * *